2,916,853
METHOD OF STABILIZING SOILS BY ADDING A HUMATE

Harold K. Latourette and Paul E. Levesque, South Charleston, W. Va., assignors to Food Machinery and Chemical Corporation, New York, N.Y., a corporation of Delaware No Drawing. Application May 5, 1955
Serial No. 506,379

1 Claim. (Cl. 47—58)

This invention relates to methods of altering the physical structure of soils. More particularly, this invention relates to new and economical methods of altering the engineering and agricultural properties of soils by adding a humate thereto.

There is a continuing and serious need, in engineering and in agriculture, for chemicals with which to alter soil properties. The supply of naturally occurring soils needing no stibilization is very limited. For large-scale engineering uses, such as road-beds and airfield construction, the supply of conventional stabilizers, such as gravel, is dwindling. Various synthetic compounds having a polymeric structure have shown utility as soil stabilizers, but their cost is so high that they have not found wide commercial use.

Prior to the invention disclosed herein, no chemical additive for soils had been developed that was both cheap enough and effective enough for wide general use, either as a soil stabilizer for engineering and related applications, or as a soil conditioner for agricultural and other uses.

An object of the present invention is to provide novel and effective means of altering soil structure.

A further object is to provide new and economical additives for soils.

A further object is to provide soils of permanently good structure.

A further object is to provide a means of increasing the agricultural yield of soils of poor normal structure.

Another object is to provide a means of minimizing erosion of surface soils.

A further object is to provide soil conditioners which are non-toxic.

A still further object is to provide a means of stabilizing soils for engineering uses.

These and related objects and advantages will become apparent from the subsequent description of the invention.

An essential feature of this invention lies in the use of certain humic acids, and salts of these acids, as additives for soils used in engineering and in agriculture.

The term "humic acid" is an ambiguous one, since it has been applied to every black, acidic solid obtained from plant or animal decomposition, regardless of the source or of the process of formation. It is well known that humic acids from different sources are not identical in either their properties or reactions, although some humic acids do show similarities with those from related sources.

It has been discovered, and is described herein, that humic acids derived from coals, and salts thereof, are effective stabilizers and conditioners for soils.

By the controlled oxidation of coals, most of the organic matter present may be converted into relatively high molecular weight acidic products of the type known as humic acids. Humic acids derived from coal are hard, black, brittle solids and are essentially insoluble in water. Almost all salts of these acids are also insoluble, with the exception of the sodium, potassium and ammonium salts. These acids are organic molecules with molecular weights over about 700, and equivalent weights over about 150. By varying the oxidation conditions, the equivalent weights may be controlled within a preferred range of about 150–250, in order to maintain the desired water solubility of the sodium salts of the acids. The structure of these humic acids is believed to be that of a condensed, carbocyclic nucleus, mostly aromatic in nature, with carboxylic acid groups attached either directly to the nucleus or on short aliphatic side chains. Hydroxyl groups are usually also present, and may be both aliphatic and phenolic.

It is generally preferred to apply these humic acids to soils as solutions of their soluble salts, making permanent by precipitating in situ as their insoluble salts, preferably the calcium, ferric or magnesium salts. The precise procedure employed depends on the soil characteristics and the purpose of the treatment.

Table 1 below describes results of soil stabilization tests wherein a 10% sodium humate solution was applied to a clay and precipitated therein. The clay used had the following characteristics (T. W. Lambe, Soil Testing for Engineers, ch. 3):

Liquid limit _____percent__ 45.0
Plasticity index _____do____ 22.4
Optimum moisture content _____do____ 20.3
Maximum density _____g./ml__ 1.68
HRB classification _____A7–6(14)

In a typical experiment, two samples of 50 parts of clay, oven-dried at 110° C. and passed through a No. 10 sieve, were each mixed thoroughly with 0.36 part of calicum hydroxide and then with 20 parts of an aqueous solution containing 10% sodium humate. The mixtures were molded by hand into as perfect spheres as possible, and kept in water-saturated air at room temperature for 6 days. After 4 days of air-drying, the samples were tested along with controls (57 parts clay mixed with 15 parts water). The clay balls were repeatedly dropped onto a concrete floor from a height of 50 inches until they broke. The stabilized ball given this test required 21 drops to break compared with 10 drops for the control. The other stabilized ball was immersed in water and withstood immersion for more than 30 hours before disintegrating, compared to complete disintegration within 1 hour for the control.

As an additional illustration, two samples of 50 parts of clay, oven-dried at 110° C. and passed through a No. 10 sieve, were each mixed thoroughly with 0.92 part magnesium chloride and then with 20 parts of an aqueous solution containing 10% sodium humate. The mixtures were molded, aged, and tested as before. A stabilized ball required 19 drops to break compared to an average of 4 drops to break 4 controls. The other stabilized ball withstood over 4 days of water immersion before disintegrating completely, compared with complete disintegration within 1 hour for the control.

The proportion of stabilizer used, as well as the particular humate salt employed, varies with the characteristics of the soil and the purpose of treatment, and whether engineering or agricultural uses are involved.

*Table 1.—Soil stabilization tests with 10% sodium humate solution*

| Cation-containing compound | Ratio of sodium humate to cation conc. | No. of drops to break | | Hrs. Withstood Under Water | |
|---|---|---|---|---|---|
| | | Stabilized | Control | Stabilized | Control |
| $Ca(OH)_2$ | molar | 12 | 10 | 4 | 1 |
| $Ca(OH)_2$ | equivalent | 21 | 10 | >30 | 1 |
| $CaCl_2$ | molar | 26 | 10 | 1 | 1 |
| $CaCl_2$ | equivalent | 13 | 10 | 1 | 1 |
| $Al_2O_3$ | molar | 11 | 4 | >30 | 1 |
| $Al_2O_3$ | equivalent | 5 | 4 | >30 | 1 |
| $MgCl_2$ | molar | 19 | 4 | 96 | 1 |
| $MgCl_2$ | equivalent | 16 | 4 | 1 | 1 |
| $Fe_2O_3$ | molar | 14 | 4 | >30 | 1 |
| $Fe_2O_3$ | equivalent | 11 | 5 | 72 | 1 |
| $Ba(OH)_2$ | molar | 6 | 5 | 8 | 1 |
| $Ba(OH)_2$ | equivalent | 13 | 5 | >30 | 1 |
| | | 5 | 5 | >30 | 1 |

In the practice of this invention, humic acids derived from coal, their water-soluble salts such as the sodium, potassium and ammonium salts, and their water-insoluble salts such as the calcium, ferrous, ferric, barium, magnesium, zinc, copper and aluminum salts are among those usable. They may be applied to the soil in a variety of ways, such as: simple mixing of the dry powdered stabilizer with the soil; mixing in a mixture of the dry acids and an inorganic salt, oxide or hydroxide containing the desired cation, followed by water; adding the desired cations to the soil followed by a solution of a soluble salt of the acids; adding a solution of a soluble salt of the acids to the soil followed by the desired cations; adding a solution of a soluble salt of the acids to soils that naturally contain the desired cations; or adding solutions of the soluble humates, followed by mineral acid, to precipitate the humic acids themselves in the soil.

As a result of this invention, humic acids, and salts thereof, are provided as a generally applicable means for effecting relatively permanent changes in soil characteristics, of wide and general utility, such as: increasing the load-bearing strength of soils, increasing cohesion in low-cohesion soils, changing the fluid permeability and compressibility of soils, increasing crumb stability, water retention and resistance to frost-heave, improving the aeration factor of soils, and as dispersants for drilling muds.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claim, the invention may be practiced by those skilled in the art, and having the benefit of this disclosure, otherwise than as specifically described and exemplified herein.

That which is claimed as patentably novel is:

A method of altering the structure of soil, comprising incorporating in the soil an effective proportion of an aqueous solution of a soluble salt of humic acids, and an inorganic barium compound, and precipitating barium humate in the soil.

References Cited in the file of this patent

UNITED STATES PATENTS

| | | |
|---|---|---|
| 2,093,047 | Hudig | Sept. 14, 1937 |

FOREIGN PATENTS

| | | |
|---|---|---|
| 22,028 | Great Britain | of 1894 |
| 361,890 | Great Britain | Nov. 23, 1931 |
| 424,260 | Great Britain | Feb. 18, 1935 |
| 701,816 | Great Britain | Jan. 6, 1954 |

OTHER REFERENCES

Ser. No. 157,223, Van Reesema (A.P.C.), published June 1, 1943.

Hackh's Chemical Dictionary, Third Edition, published by Blakiston (Phila.), 1944, pages 207 and 338 are relied on.

Wilson et al.: "Coal, Coke and Coal Chemicals," published 1950 by McGraw-Hill, N.Y., First Edition, pages 69 and 70 relied upon.